(No Model.)
H. F. HICKS.
VEHICLE WHEEL.
No. 396,872. Patented Jan. 29, 1889.
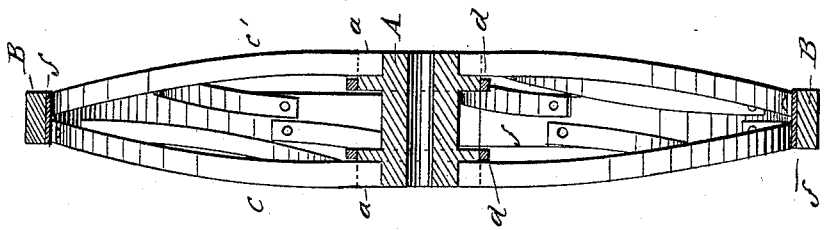
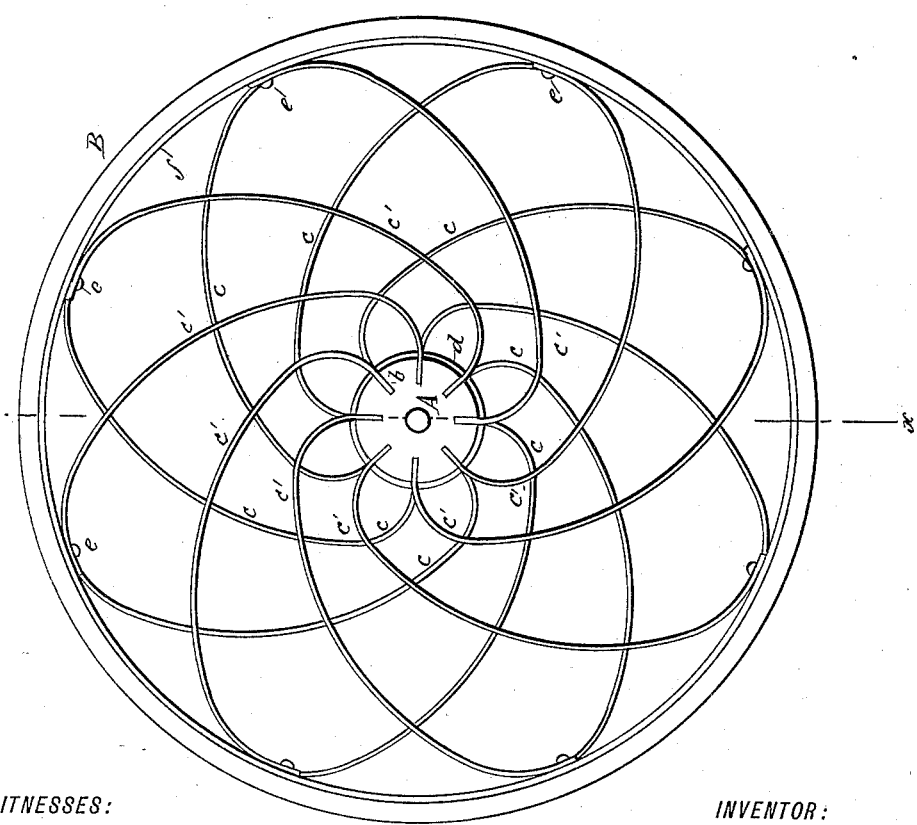
WITNESSES:
Chas. Nida
C. Sedgwick
INVENTOR:
H. F. Hicks
BY Munn & Co.
ATTORNEYS.

UNITED STATES PATENT OFFICE.

HORATIO F. HICKS, OF ASHLAND, OREGON.

VEHICLE-WHEEL.

SPECIFICATION forming part of Letters Patent No. 396,872, dated January 29, 1889.

Application filed July 6, 1888. Serial No. 279,209. (No model.)

*To all whom it may concern:*

Be it known that I, HORATIO F. HICKS, of Ashland, in the county of Jackson and State of Oregon, have invented new and useful Improvements in Wagon-Wheels, of which the following is a specification, reference being had to the annexed drawings, forming a part thereof, in which—

Figure 1 is a side elevation of my improved wagon-wheel, and Fig. 2 is a vertical transverse section taken on line $x$ $x$ in Fig. 1.

Similar letters of reference indicate corresponding parts in both views.

The object of my invention is to construct a wagon-wheel with elastic spokes which will yield when the wheel passes over a rough, uneven road or runs upon an obstruction.

My invention consists in the combination, with the hub and rim of a wheel, of two series of curved spring-spokes, the curves of the two series being oppositely arranged with respect to each other.

The hub A is provided with two end flanges, $a$ $a'$, in which are formed radial slots $b$, for receiving the ends of the spokes $c$ $c'$. When the hub A is made of wood or other material requiring re-enforcing, rings $d$ are shrunk onto the flanges $a$ $a'$. The spokes $c$ $c'$ are formed on an approximately volute curve. Their inner ends are secured in the slots $b$ of the hub, and their outer ends are fastened to the rim B of the wheel by bolts or rivets $e$.

The wheel-rim B is provided with a metallic lining, $f$, inserted between the ends of the spring-spokes and the rim B. The rim B is to be provided with a tire in the usual way.

When pressure is exerted upon the rim of the wheel, the rim is thrown upward, while the hub is retained in its position by the inertia of the load. The load carried by the hub is suspended from the rim by the springs above it, and is supported by the springs below the hub which are under compression.

Having thus described my invention, I claim as new and desire to secure by Letters Patent—

1. In a wagon-wheel, the combination, with the hub and rim, of two series of curved spring-spokes, the curves of the spokes of one series being arranged oppositely with reference to the curves of the spokes of the other series, substantially as specified.

2. In a wagon-wheel, the combination of a hub having end flanges and curved spokes inserted in the flanges of the hub and secured to the rim, the curves of one series of spokes being oppositely arranged with reference to the curves of the spokes of the other series, substantially as specified.

HORATIO F. HICKS.

Witnesses:
 G. F. BILLINGS,
 HENRY C. HICKS.